United States Patent
Kase et al.

(10) Patent No.: US 7,333,104 B2
(45) Date of Patent: Feb. 19, 2008

(54) METHOD AND PROGRAM OF CONVERTING THREE-DIMENSIONAL SHAPE DATA INTO CELL INTERNAL DATA

(75) Inventors: Kiwamu Kase, Wako (JP); Yoshinori Teshima, Wako (JP); Shuntaro Yamazaki, Wako (JP); Shugo Usami, Wako (JP); Akitake Makinouchi, Wako (JP)

(73) Assignee: Riken, Saitama (JP)

( * ) Notice: Subject to any disclaimer, the term of this patent is extended or adjusted under 35 U.S.C. 154(b) by 125 days.

(21) Appl. No.: 10/496,829

(22) PCT Filed: Dec. 3, 2002

(86) PCT No.: PCT/JP02/12629

§ 371 (c)(1),
(2), (4) Date: Jan. 5, 2005

(87) PCT Pub. No.: WO03/048980

PCT Pub. Date: Jun. 12, 2003

(65) Prior Publication Data

US 2005/0107992 A1   May 19, 2005

(30) Foreign Application Priority Data

Dec. 4, 2001 (JP) ............................. 2001-370040

(51) Int. Cl.
*G06T 17/00* (2006.01)
(52) U.S. Cl. ...................................... 345/420; 345/423
(58) Field of Classification Search ...................... None
See application file for complete search history.

(56) References Cited

U.S. PATENT DOCUMENTS 4,092,201 A    5/1978 Wommelsdorf
(Continued)

FOREIGN PATENT DOCUMENTS

EP    0 938 949 A1    9/1999
(Continued)

OTHER PUBLICATIONS

Kela, A., Hierarchical octree approximations for boundary representation-based geometric models, 1989, Computer Aided Design, vol. 21, pp. 1-8.*

(Continued)

*Primary Examiner*—Ulka Chauhan
*Assistant Examiner*—Said Broome
(74) *Attorney, Agent, or Firm*—Griffin & Szipl, P.C.

(57) ABSTRACT

A method of converting three-dimensional shape data into cell internal data. The method includes an oct-tree division step of dividing external data including boundary data of a target object into rectangular parallelepiped cells having boundary planes orthogonal to each other by oct-tree division. The method further includes a cell classification step of classifying each of the cells into an internal cell positioned inside or outside the target object or a boundary cell including the boundary data, and a cut point determination step of determining cut points of edges of the boundary cell based on the boundary data. The method further includes a boundary surface determination step of connecting cut points to form a polygon, and determining the polygon as the cell internal data when the number of the determined cut points is no fewer than 3 and no more than 12.

4 Claims, 9 Drawing Sheets

U.S. PATENT DOCUMENTS

| | | | |
|---|---|---|---|
| 4,665,192 A | 5/1987 | Masters | |
| 4,665,492 A | 5/1987 | Masters | |
| 4,694,404 A | 9/1987 | Meagher | |
| 4,710,876 A | 12/1987 | Cline et al. | |
| 4,719,585 A | 1/1988 | Cline et al. | |
| 4,729,098 A | 3/1988 | Cline et al. | |
| 5,095,419 A | 3/1992 | Seki et al. | |
| 5,166,876 A | 11/1992 | Cline et al. | |
| 5,197,013 A | 3/1993 | Dundorf | |
| 5,303,141 A | 4/1994 | Batchelder et al. | |
| 5,345,490 A | 9/1994 | Finnigan et al. | |
| 5,510,066 A | 4/1996 | Fink et al. | |
| 5,517,602 A * | 5/1996 | Natarajan | 345/419 |
| 5,594,652 A | 1/1997 | Penn et al. | |
| 5,796,617 A | 8/1998 | St. Ville | |
| 5,807,448 A | 9/1998 | Nakazawa | |
| 6,075,538 A | 6/2000 | Shu et al. | |
| 6,136,252 A | 10/2000 | Bedal et al. | |
| 6,214,279 B1 | 4/2001 | Yang et al. | |
| 6,405,095 B1 | 6/2002 | Jang et al. | |
| 6,445,390 B1 | 9/2002 | Aftosmis et al. | |
| 6,471,800 B2 | 10/2002 | Jang et al. | |
| 6,504,742 B1 | 1/2003 | Tran et al. | |
| 6,606,528 B1 | 8/2003 | Hagmeier et al. | |
| 6,618,607 B2 | 9/2003 | Song | |
| 6,627,835 B1 | 9/2003 | Chung et al. | |
| 6,639,597 B1 | 10/2003 | Zwicker et al. | |
| 6,643,560 B2 | 11/2003 | Shimomura | |
| 6,968,075 B1 | 11/2005 | Chang | |
| 6,982,710 B2 | 1/2006 | Salomie | |
| 7,088,363 B2 | 8/2006 | Kase et al. | |
| 7,110,852 B2 | 9/2006 | Ohmori et al. | |
| 2002/0004713 A1 | 1/2002 | Wakabayashi et al. | |
| 2002/0055692 A1 | 5/2002 | Tanaka et al. | |
| 2002/0113331 A1 | 8/2002 | Zhang et al. | |
| 2003/0001836 A1 | 1/2003 | Ernst et al. | |
| 2004/0267400 A1 | 12/2004 | Ohmori et al. | |
| 2005/0015173 A1 | 1/2005 | Ohmori et al. | |
| 2006/0228248 A1 | 10/2006 | Larsson | |

FOREIGN PATENT DOCUMENTS

| | | |
|---|---|---|
| EP | 1 229 463 A2 | 8/2002 |
| JP | 02-236677 | 9/1990 |
| JP | 03-021432 | 1/1991 |
| JP | 04-075850 | 3/1992 |
| JP | 06-315849 | 11/1994 |
| JP | 06-348862 | 12/1994 |
| JP | 07-057089 | 3/1995 |
| JP | 07-334541 | 12/1995 |
| JP | 10-063873 | 3/1998 |
| JP | 11-096400 | 4/1999 |
| JP | 2000-182081 | 6/2000 |
| JP | 2001-194881 A | 7/2000 |
| JP | 2000-340476 | 12/2000 |
| JP | 2001-022961 | 1/2001 |
| JP | 2001-025023 A | 1/2001 |
| JP | 2001-225393 | 8/2001 |
| JP | 2001-370040 | 12/2001 |
| JP | 2002-024306 | 1/2002 |
| JP | 2002-230054 | 8/2002 |
| WO | 02/23408 A1 | 3/2002 |

OTHER PUBLICATIONS

International Search Report, completed Jan. 21, 2003.
Kazutoshi Yonekawa et al, "Kukan Bunkatsu Model o Mochiita Keijo Modeler", Transactions of Information Processing Society of Japan, vol. 37, No. 1, pp. 60-69, Jan. 15, 1996.
Avila, Ricardo S., et al., "A Haptic Interaction Method for Volume Visualization," Oct. 27, 1996, pp. 197-204.
Ayala, D., et al., "Object Representation by Means of Nonminimal Division Quadtrees and Octrees," ACM Transactions on Graphics, Jan. 1985, pp. 41-59, vol. 4, No. 1.
Hoffmann, Christoph M., "The Problems of Accuracy and Robustness in Geometric Computation", Mar. 1989, pp. 31-41.
Kase, K. et al., "Volume CAD", Volume Graphics, pp. 145-173, 2003.
Lorensen, William E. et al., "Marching Cubes: A High Resolution 3D Surface Construction Algorithm", Computer Graphics, vol. 21, No. 4, pp. 163-169, Jul. 1987.
Navazo, I. et al., "A Geometric Modeller based on the Exact Octtree Representation of Polyhedra", Computer Graphics Forum 5, pp. 91-104, 1986.
Navazo, I., "Extended Octtree Representation of General Solids with Plane Faces; Model Structure and Algorithms", Comput. & Graphics, vol. 13, No. 1, pp. 5-16, 1989.
Roy, U., et al., "Computation of a geometric model of a machined part from its NC machining programs," Computer-Aided Design, 1999, pp. 401-411, No. 31.
Schroeder, William J., "A Topology Modifying Progressive Decimation Algorithm," Oct. 1997, pp. 1-9.
Schroeder, William J. et al, "Decimation of Triangle Meshes," Computer Graphics, Jul. 3, 1992, pp. 65-70, vol. 26.
Shute, Gary, "Overview of C Programming," Aug. 23, 1999, http://www.d.umn.edu/~gshute/C/overview.html, printed Nov. 1, 2004.
Yamaguchi, K. et al, "Computer-Integrated Manufacturing of Surfaces Using Octree Encoding," IEEE CG&A, Jan. 1984, pp. 60-62.
Zesheng, Tang, "Octree Representation and Its Applications in CAD," Journal of Computer Science and Technology, 1992, pp. 29-38, vol. 7, No. 1.
Office Action issued in related U.S. Appl. No. 10/482,919 dated Feb. 7, 2007.
Kobbelt, Leif P. et al., "Feature Sensitive Surface Extraction from Volume Data," ACM SIGGRAPH 2001, Aug. 12-17, 2001, pp. 47-66.
Brunet, Pere et al., "Solid Representation and Operation Using Extended Octrees," ACM Transactions on Graphics, vol. 9, No. 2, Apr. 1990, pp. 170-197.
Pfister, Hanspeter et al., "Cube-4—A Scalable Architecture for Real-Time Volume Rendering," IEEE 1996, pp. 47-54,100.
Wallin, Ake, "Constructing Isosurfaces from CT Data," IEEE Computer Graphics & Applications, IEEE 1991, pp. 28-33.
Office Action dated May 7, 2007 in related U.S. Appl. No. 10/486,653.
Haley, Michael B., "Incremental Volume Rendering Using Hierarchical Compression," Eurographics '96 vol. 15, No. 3, 1996, pp. 45-55.
Ward, Gregory J., "The RADIANCE Lighting Simulation and Rendering System," Computer Graphics Proceedings, Annual Conference Series, 1994, pp. 459-472.
Roy, Uptal et al., "3-D Object Decomposition with Extended Octree Model and its Application in Geometric Simulation of NC Machining," Robotics and Computer-Integrated Manufacturing 14, 1998, pp. 317-327.
Shepard, M.S. et al., "Parallel Automatic Adaptive Analysis," Parallel Computing 23, 1997, pp. 1327-1347.
European Search Report issued in related application No. EP 02743831.6, completed Mar. 23, 2007 and mailed Apr. 3, 2007.
Office Action issued in related U.S. Appl. No. 10/505,224, dated Jan. 24, 2007.
Okamoto, Katsunari et al., "Stress Analysis of Optical Fibers by a Finite Element Method," Oct. 1981, IEEE vol. QE-17, No. 10, pp. 2123-2129.
Office Action issued in related U.S. Appl. No. 10/482,919, dated Jun. 29, 2007.
Ramesh, R., et al. "Error compensation in machine tools - a review Part 1: geometric, cutting-force induced and fixture-dependent errors," International Journal of Machine Tools & Manufacture 40 (2000) pp. 1235-1256.
Liu, Qing, "Form-Accuracy Analysis and Prediction in Computer-Integrated Manufacturing," International Journal of Machine Tools & Manufacture, vol. 37, No. 3, 1997, pp. 234-248.

Supplementary European Search Report issued in related application No. EP 02 76 0631, completed Sep. 12, 2007.
Office Action issued in related U.S. Appl. No. 10/486,653, dated Oct. 18, 2007.

Office Action issued in related U.S. Appl. No. 10/595,047, dated Sep. 28, 2007.

* cited by examiner

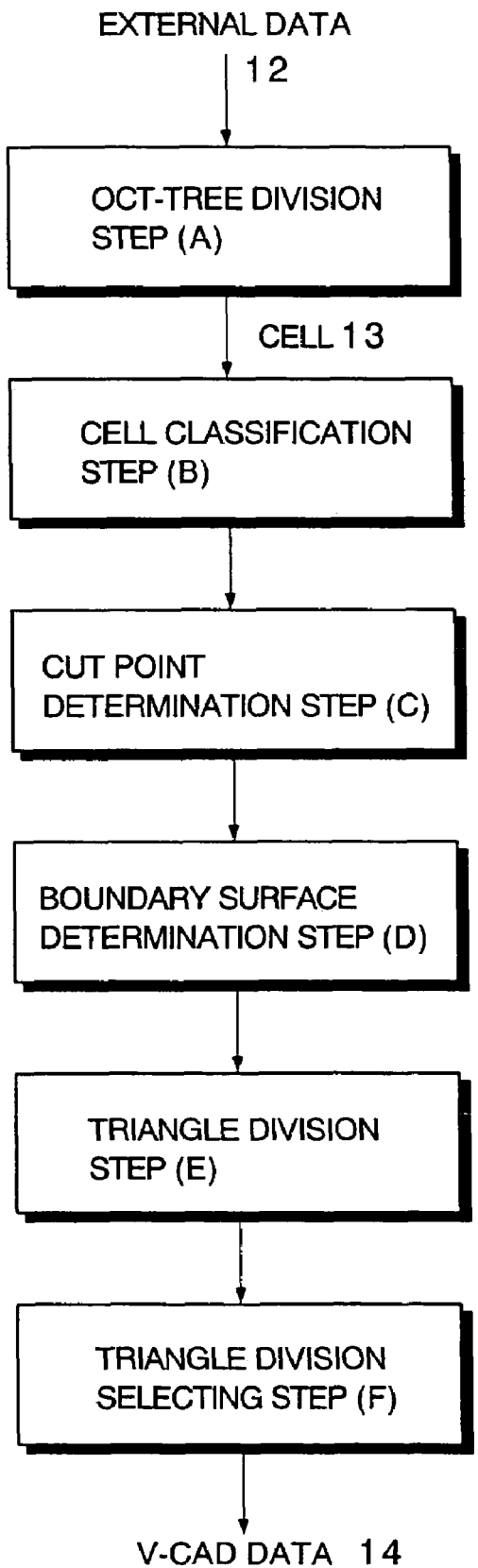

6 FACES

12 EDGES

8 VERTEXES (LU,LF,UF) or
([2],[4],[1 2])

KTC3

KTC4a
(LB,LF,UB,UF)

KTC4b
(DB,DF,UB,UF)

KTC5
(LD,LB,LF,UB,UF)

KTC6
(LD,RU,RF,DB,DF,UB)

KTC4a

KTC4b

KTC5

KTC6

FIG.8A  KTC3
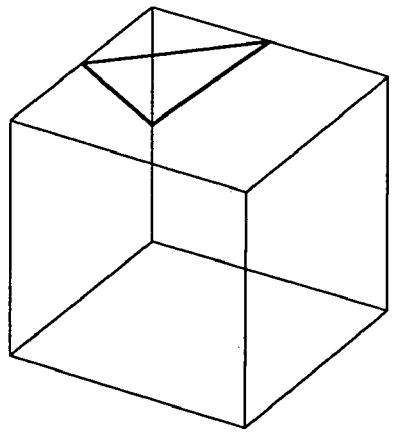
FIG.8B
KTC4a
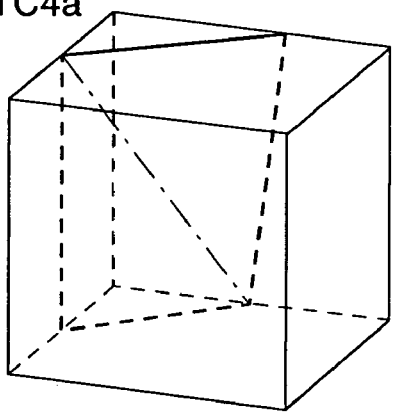
FIG.8C
KTC4b
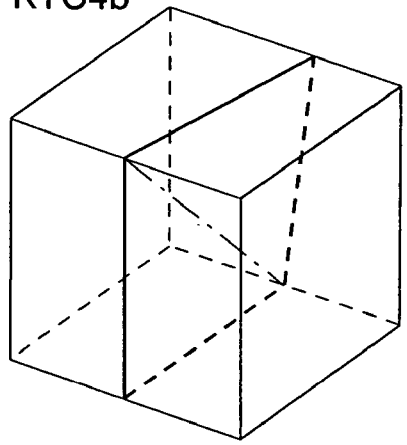
FIG.8D
KTC5
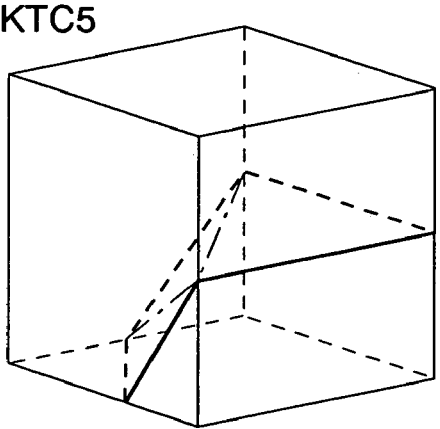
FIG.8E
KTC6
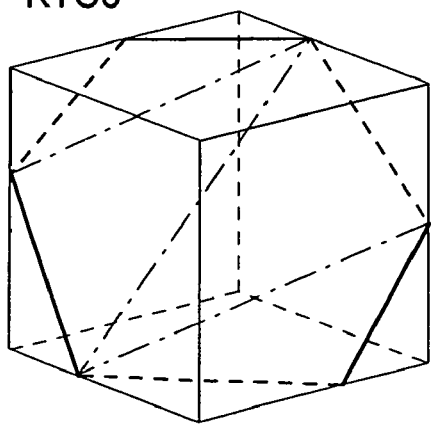

FIG.9A  7 CUT POINTS
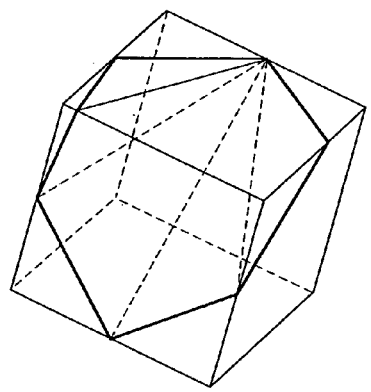
FIG.9B  8 CUT POINTS
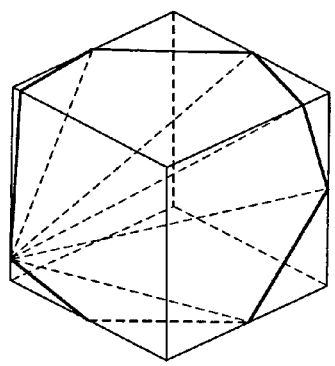
FIG.9C  9 CUT POINTS
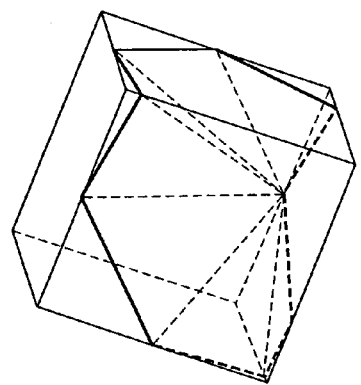
FIG.9D  10 CUT POINTS
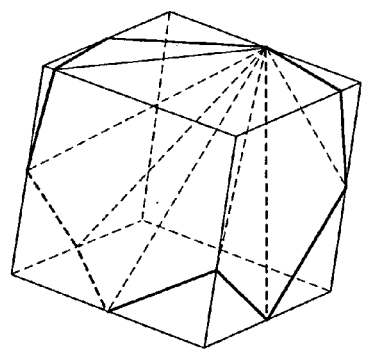
FIG.9E  11 CUT POINTS
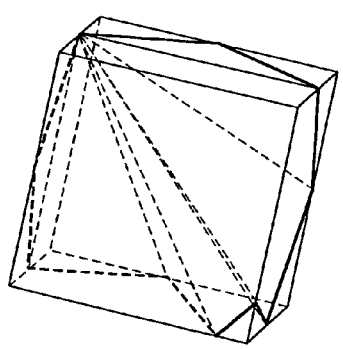
FIG.9F  12 CUT POINTS
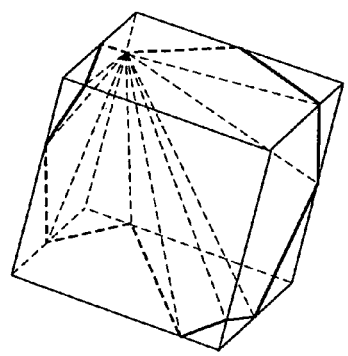

METHOD AND PROGRAM OF CONVERTING THREE-DIMENSIONAL SHAPE DATA INTO CELL INTERNAL DATA

This is a National Phase Application in the United States of International Patent Application No. PCT/JP02/12629 filed Dec. 3, 2002, which claims priority on Japanese Patent Application No. 370040/2001 filed Dec. 4, 2001. The entire disclosures of the above patent applications are hereby incorporated by reference.

BACKGROUND OF THE INVENTION

1. Field of the Invention

The present invention relates to a storing method of storing, with a small memory capacity, substantial data that is configured by integrating shape data and physical property data so that CAD and simulation can be integrated. Specifically, the present invention relates to a method and program of converting three-dimensional shape data into internal data of a cell by oct-tree division.

2. Description of the Related Art

In the field of leading-edge research and technology development, as the research and technology is highly developed and complicated, it becomes inevitable to perform a process of trial and error many times, so that a risk of failure in the development process is raised. In order to lead in science and technology, it is very important to avoid such a risk as much as possible, and to make innovative advancement and efficiency promotion.

At present, in the field of research and technology development, CAD (Computer Aided Design), CAM (Computer Aided Manufacturing), CAE (Computer Aided Engineering), CAT (Computer Aided Testing) are used as simulation means for designing, processing, analyzing, and testing, respectively.

Further, the C-Simulation (Corporative Simulation) that is successive simulation, A-CAM (Advanced CAM) that takes processing into account, and D-fabrication (Deterministic Fabrication) that achieves ultimate accuracy will become widespread by the present invention.

When using the above-mentioned simulation means, data of a target object is stored by CSG (Constructive Solid Geometry) or B-rep (Boundary Representation).

However, in the case of CSG, an entire target object is stored as an aggregation of minute solid models. Accordingly, the data amount becomes large, and simulation means (software, for example) handles a large amount of data. Therefore, there is a problem in that even a large computer takes much time to perform data analyzing.

In the case of B-rep, since the target object is represented by the boundary, the data amount becomes small. However, the information about the inside of the boundary surface cannot be obtained directly, and there is a problem in that the data itself is not suitable to deforming analysis.

Furthermore, according to the above-mentioned conventional data storing means, each time heat/fluid analysis, largely deforming analysis of a solid, or coupled analysis of them is performed, the data is divided into meshes suitable to the analysis, and a finite element method or the like is used. The result of the analysis can be displayed, for example, but it is difficult to integrate CAD and simulation. Accordingly, there is a problem in that respective processes of designing, analyzing, processing, assembling, testing, and so on cannot be managed by using the same data.

In other words, the conventional Solid/Surface-CAD (hereinbelow, referred to as S-CAD) has the following problems.

(1) The data communication, and internal converting operation of the data are poor (that is, there is a problem of a numerical value error and a process method).

(2) The data cannot be applied directly to the simulation (that is, since the data does not include the internal data, the meshes need to be generated).

(3) It is not possible to consider how to perform the processing by CAM (there is only a final shape).

Further, there are the following problems regarding the processing.

(1) It is not possible to represent the processing (the aid of rough processing and aid of process designing are inadequate).

(2) The data cannot cope with a new processing method such as laser processing and ultra front edge processing (that is, other processing except cutting processing cannot be performed, and numerical value accuracy is inadequate).

(3) A processing method cannot be selected when a target object is a complex having different material properties inside.

In order to solve the above problems, prior to the present patent application, the inventor(s) of the present invention made the invention "Method of Storing Substantial Data Configured by Integrating Shape Data and Physical Property Data" that was filed as Japanese patent application No. 2001-25023).

According to this prior invention, as schematically shown in FIG. 1, external data including boundary data of a target object is divided into rectangular parallelepiped cells by oct-tree division. Each of rectangular parallelepiped cells has boundary faces orthogonal to each other. Then, each cell is classified into an internal cell 13a positioned inside or outside the target object or a boundary cell 13b including a boundary face. In FIG. 1, the reference numeral 15 designates a cut point.

With this prior invention, various physical property values are stored in respective cells so that the integrated substantial data of the shape data and the physical property data can be stored by using a small memory capacity. Thereby, it is possible to achieve integral management of shape data, structure data, physical property data, and history of a target object. Accordingly, data about a series of processes including designing, processing, assembling, testing, evaluating, and the like can be managed by the same data, and CAD and simulation can be integrated.

In the case of this storing method (hereinbelow, referred to as "volume CAD" or "V-CAD") of storing substantial data, the boundary data for restructuring the boundary surface of the three-dimensional shape data (external data) needs to be held in the boundary cell.

If the boundary data cannot maintain continuity with the neighboring cells, when the surface of the cell is divided into triangle-shaped meshes, a gap (crack), a minute triangle, or a thin long triangle is generated. Therefore, a problem arises in that accurate simulation cannot be performed.

Meanwhile, there is a known method (crack patch method) of filling up a gap between the triangle meshes that is generated between different size volumes. However, in this method, the gap is simply filled up so that the triangle meshes sharing the edge thereof and making a sharp angle therebetween are generated at the position where the original surface is smooth. In order to solve this problem, Japanese Laid-Open Patent Publication No. 2001-22961 proposes "Method of Generating Same Phase Surface from Non- Uniformity Volume Model". However, in this method, application of different model volume CAD is difficult, and the process of this method is complicated.

SUMMARY OF THE INVENTION

It is an object of the present invention to provide a data converting method and program by which for volume CAD, with the neighboring cell continuity being maintained, without generating a gap or forming an inaccurate triangle, it is possible to configure, from the external data, the cell internal data of which boundary surface can be divided into the triangle meshes that approximate even a curved surface having a large curvature with high accuracy.

According to the present invention, there is provided a method and program of converting three-dimensional shape data into cell internal data, comprising: an oct-tree division step of dividing external data including boundary data of a target object into rectangular parallelepiped cells having boundary planes orthogonal to each other by oct-tree division; a cell classification step of classifying each of the cells into an internal cell positioned inside or outside the target object or a boundary cell including the boundary data; a cut point determination step of determining cut points of edges of the boundary cell based on the boundary data; and a boundary surface determination step of connecting cut points to form a polygon, and determining the polygon as the cell internal data when the number of the determined cut points is no fewer than 3 and no more than 12.

By the method and program, it is possible to store, with a small memory capacity, the external data as hierarchical configuration of the cells that are formed by the oct-tree division of the external data and that have boundary faces orthogonal to each other.

Furthermore, by the cut point determination step and the boundary surface determination step, it is possible to obtain the cell internal data as the polygon with the neighboring cell continuity being maintained, without generating a gap or a deformed triangle.

According to one aspect of the preset invention, the boundary cells having 3, 4, 5 and 6 cut points, respectively are classified into different boundary cell types, respectively. Combinations of edges to be cut are previously set for each of the boundary cell types. The boundary cell type for the boundary cell is determined based on the determined cut points and cut edges by pattern matching. Thereby, it is possible to store the boundary surface by using the boundary cell type and the edge combination. Accordingly, it is possible to store the boundary surface with a small memory capacity while maintaining the neighboring cell continuity.

According to another aspect of the present invention, in the boundary surface determination step, tracing is performed only on the faces of the boundary cell through the cut points to form a closed loop as the polygon. Thereby, the boundary surface can be stored with triangles represented by the cut points.

Preferably, the method and the program further comprises; a triangle division step of dividing the polygon into a plurality of triangles by connecting the cut points, in one or more dividing manners; and a triangle division selecting step of extending each of normal lines included in the external data, selecting from the plurality of triangles, the triangle that has an intersecting point with the each extended normal line and has the least distance from boundary surface part of the each extended normal line, obtaining an angle made between a normal line of the selected triangle and the each extended normal line, and selecting the dividing manner in which a maximum angle difference between the normal line of the triangle and the extended normal line is smallest.

Thereby, even when a boundary surface is a curved surface, it is possible to maintain the neighboring cell continuity and form the divided triangle meshes that can approximate the curved surface without generating a gap and inaccurate triangle.

Other objects, features, and advantages of the present invention will become apparent from the following the detailed description with reference to the drawings.

BRIEF DESCRIPTION OF DRAWINGS

FIG. 2 is a flowchart showing a data converting method and program according to an embodiment of the present invention;

FIGS. 8A through 8E show examples of boundary cells having 3, 4, 5 and 6 cut points, respectively when boundary surfaces are curved surfaces according to the embodiment of the present invention; and FIGS. 9A through 9F show examples of boundary cells having 7, 8, 9, 10, 11 and 12, respectively according to the embodiment of the present invention.

DESCRIPTION OF THE PREFERRED EMBODIMENTS

Figure 1:
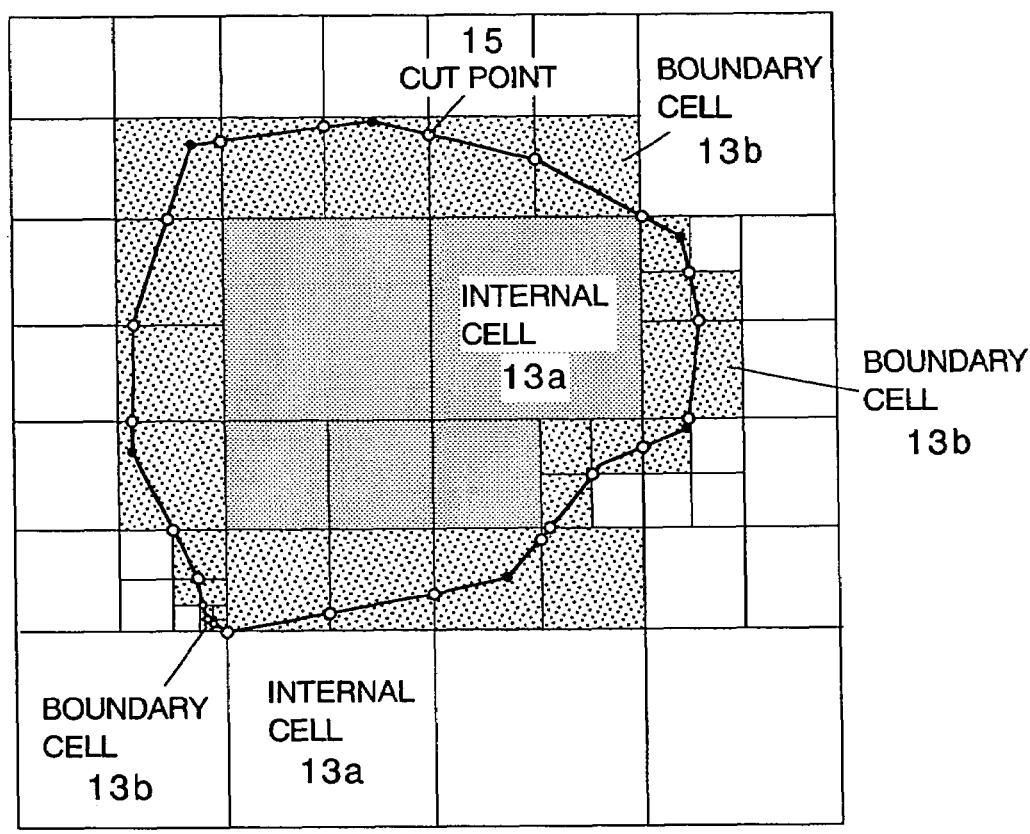
FIG. 1 is a schematic illustration two-dimensionally showing a dividing method according to the present invention.

In the following, a preferred embodiment of the present invention will be described with reference to the drawings.

FIG. 2 is a flowchart of a data converting method and data converting program according to the embodiment of the present invention. As shown in FIG. 2, the data converting method according to the embodiment includes an oct-tree division step (A), a cell classification step (B), a cut point determination step (C), a boundary surface determination step (D), and a triangle division step (E), and a triangle division selecting step (F). Similar to the data converting method, the data converting program according to the embodiment includes an oct-tree division program code (A), a cell classification program code (B), a cut point determination program code (C), a boundary surface determination program code (D), and a triangle division program code (E), and a triangle division selecting program code (F). The following description is mainly directed to the data converting method. However, the data converting program has the same function as the data converting method.

External data 12 input from the outside is polygon data representing a polyhedron, a tetrahedron element data or hexahedron element data used for a finite element method, curved surface data used for three-dimensional CAD or a CG tool, or data that represents other three-dimensional shape by using information configured by a partial plane and curved surfaces.

The external data 12 is not limited to such data (referred to as S-CAD data), and may be (1) data that a person inputs and creates by a V-CAD interface (V-interface), (2) surface digitized data formed by a measuring device, sensor, or digitizer, or (3) volume data including internal information such as voxel data that is used for volume rendering, CT scan or MRI.

In the oct-tree division step (A), the external data 12 that is obtained by an external data obtaining step (not shown in the drawing) and includes boundary data of the target object is divided, by the oct-tree division, into rectangular parallelepiped cells 13 each of which has boundary faces orthogonal to each other. Specifically, in this oct-tree division step (A), space division is performed by modified oct-tree division. In oct-tree representation, i.e., in the space division by the oct-tree division, a standard rectangular parallelepiped 13 including (at least a part of) a target three-dimensional object is divided into eight parallelepipeds, and this division is repeatedly performed until the divided rectangular parallelepiped is completely included in or excluded from each region. By performing this oct-tree division, it is possible to greatly decrease data amount compared to the voxel data representation.

One divided space region that is formed by the oct-tree space division is referred to as a cell 13. The cell 13 is a rectangular parallelepiped having boundary faces orthogonal to each other. One region existing in the space is represented by cell hierarchical configuration, the number of divisions, or resolution. In this manner, the target object is represented as the cells having different sizes that are put on top of each other in the entire space.

The special case of oct-tree division representation where all of the representing cells are congruent rectangular parallelepipeds (having the same number of divisions) is the same as the voxel representation.

In the cell classification step (B), each divided cell 13 is classified into an internal cell 13a positioned inside or outside the target object or a boundary cell 13b including the boundary data.

That is, according to the embodiment of the present invention, the modified oct-tree division is used to represent the boundary cell 13b. In addition, the internal cell 13a (rectangular parallelepiped) is the maximum size cell that does not contain the boundary of the target object, and the boundary cell 13b is the cell that includes the boundary information of the external data 12.

In the cut point determination step (C), the cut points 15 of the edges of the boundary cell 13b are determined based on the boundary data.

In the boundary surface determination step (D), when the number of the determined cut points is no fewer than 3 and no more than 12, the polygon formed by connecting the cut points is determined as the cell internal data of the boundary surface. That is, in the boundary surface determination step (D), the polygon is a closed loop that is formed by tracing on only the cell surface through the cut points of the edges (the polygon is not always included in one plane as shown in FIG. 8D, for example). Alternatively, the boundary cells 13b having 3, 4, 5 and 6 cut points are respectively classified into different boundary cell types (KTC3, KTC4a, KTC4b, KTC5, KTC6). Combinations of the edges to be cut are previously set for each boundary cell type, and the boundary cell type and the edge combination can be determined by pattern matching based on the determined number of cut points and the cut edges.

In the triangle division step (E), the polygon determined in the boundary surface determination step (D) is divided into a plurality of triangles by connecting cut points, as shown in FIGS. 8B through 8E. Mostly, there are a plurality of triangle dividing manners (i.e., cut point connecting manners).

In the triangle division selecting step (F), each normal line included in the boundary data of the external data 12 is extended, and each of the triangles that has the intersecting point with the extended normal line and has the least distance from the boundary surface part of this normal line is selected. Then, an angle made between the normal line of each selected triangle and the extended normal line is calculated. These processes are performed for each of the triangle dividing manners. Thereafter, the triangle dividing manner in which the maximum angle difference between the normal line of the triangle and the extended normal line becomes smallest is selected from a plurality of the triangle dividing manner.

According to the data converting method of this embodiment, the steps (A) through (F) are repeatedly performed in accordance with necessity. By using the thus-obtained V-CAD data, simulations such as designing, analyzing, processing, assembling, and testing are successively performed. Then, in an output step, the result of the simulation is output as triangle patching data such as CAM or polygon data.

In the following, the embodiment of the present invention will be described in detailed.

The external data 12 including the boundary data of the target object is assumed to be a curved surface or triangle patch (nets or meshes), (hereinbelow, referred to as an input surface). The following description is directed to the data converting method in which the boundary cell types KTC3, KTC4a, KTC4b, KTC5, and KTC6 that are the internal representation types of the volume CAD are formed by converting the information only about the normal lines of the input surface and cut points of the edges of each boundary cell formed by the space division (voxel or oct-tree division). The boundary cell type KTC3, KTC4a, KTC4b, KTC5, or KTC6 is called KT cell or KTC for short.

Figure 3A:
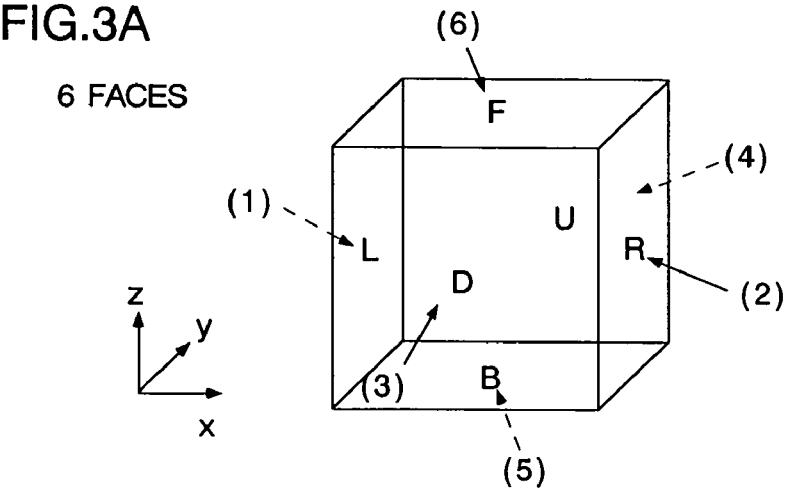
FIGS. 3A through 3C show respective parts of a boundary cell including boundary data according to the embodiment of the present invention.
Figure 3B:
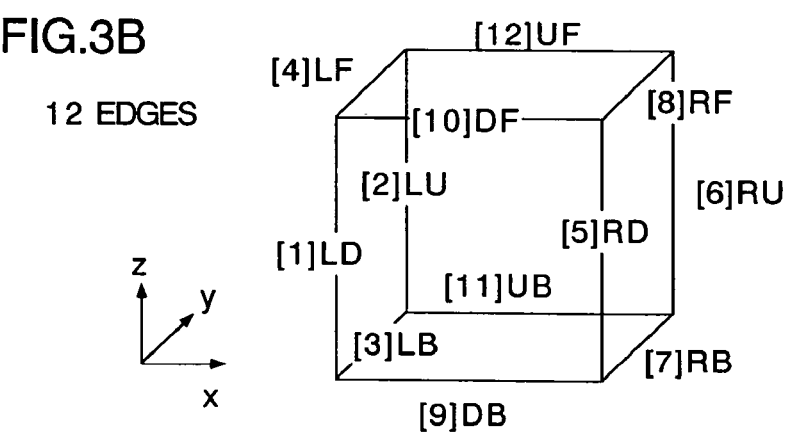
Figure 3C:
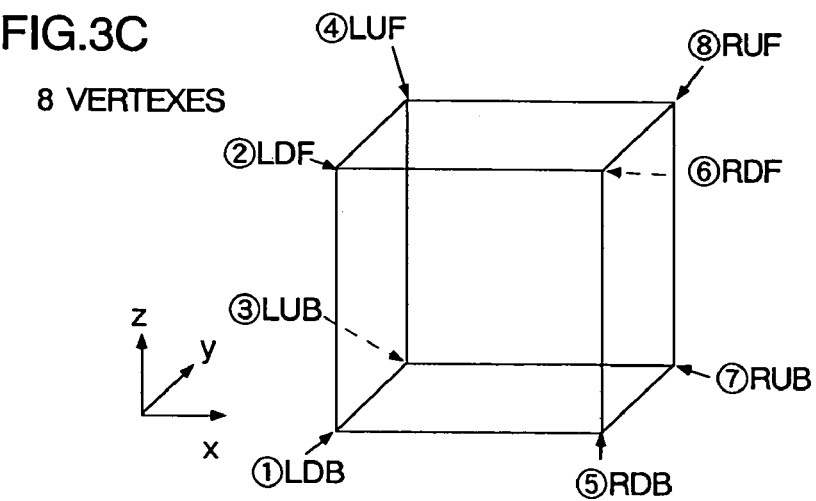
Figure 4A:
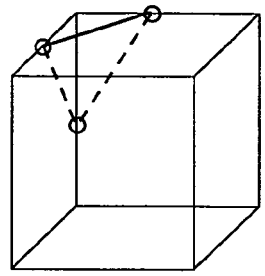
FIGS. 4A through 4E show examples of boundary cells having 3, 4, 5, and 6 cut points, respectively according to the embodiment of the present invention.
Figure 4B:
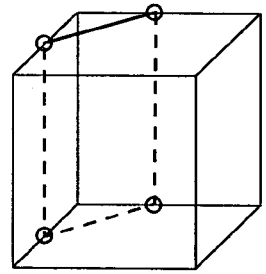
Figure 4C:
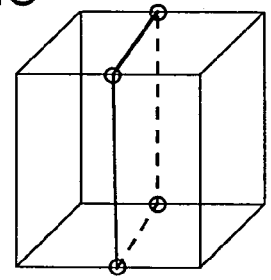
Figure 4D:
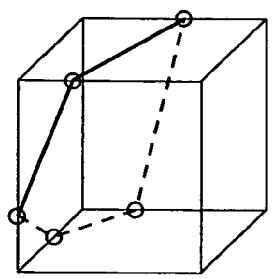
Figure 4E:
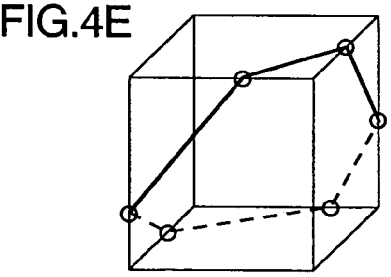

FIGS. 3A, 3B and 3C show respective parts of the cell including the boundary data. The rectangular parallelepiped cell having the 6 boundary faces orthogonal to each other formed by the oct-tree division has 6 faces, 12 edges (ridgelines), and 8 vertexes.

In FIG. 3A, the face direction marks (face marks) L, R, D, U, B, and F or (1), (2), (3), (4), (5) and (6) means "left", "right", "down", "up", "backward", and "forward" when seeing in the positive direction of Z axis. In this order, the marks L, R, D, U, B, and F or (1), (2), (3), (4), (5) and (6) have higher priority.

As shown in FIG. 3B, the marks LD, LU, LB, LF, RD, RU, RB, RF, DB, DF, UB, and UF of two face marks or [1] to [12] designate 12 edges, respectively. In this order [1] to [12], the edges have higher priority.

As shown in FIG. 3C, LDB, LDF, LUB, LUF, RDB, RDF, RUB, and RUF of three face marks or ① to ⑧ designate the vertexes, respectively. In this order ① to ⑧, the vertexes have higher priority.

These marks and numbers may be arbitrary, and other marks, numbers or the combination thereof suitable to logical computation may be used.

In the following, the marks of the cut edges in KTC shown in FIGS. 3A through 3C are used as the reference marks for the edges.

FIGS. 4A through 4E designate the boundary cells having 3, 4, 5 and 6 cut points, respectively when the boundary surface included in the boundary data is a plane surface. The tracing is started from the cut point of an arbitrary edge, the neighboring edge is then searched for, and the cut point of the start edge is connected to the cut point of the neighboring edge. Thus, tracing is performed until the connection of the cut point returns to the cut point of the start edge. In this manner, a closed loop (polygon) is formed by connecting the cut points. The edges neighboring each other always have one same face mark out of two face marks representing the edge.

In the triangle division step (E), the cut points of the polygon are connected so that the polygon can be divided into a plurality of triangles. In most cases, there are a plurality of triangle dividing manners in which the polygon is divided into a plurality of triangles. Specifically, in the case of KTC4a and KTC4b, there are two triangle dividing manners of dividing the polygon into plural (two) triangles, in the case of KTC5, there are 5 triangle dividing manners, and in the case of KTC6, there are 14 triangle dividing manners. The thus-evolved boundary cell type (hereinbelow, referred to as evolved KTC) results in the different shape depending on the triangle dividing manner. Accordingly, in the triangle division selecting step (F), it is necessary to select the triangle dividing manner that is the best approximation to the boundary data of the external data 12.

Figure 5A:
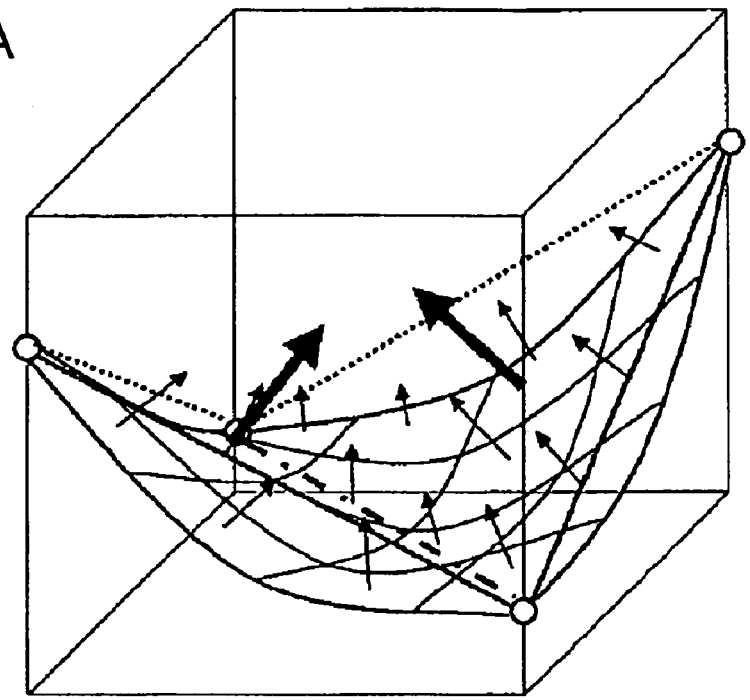
FIGS. 5A and 5B are schematic illustrations showing a method of selecting triangle dividing manner according to the embodiment of the present invention.
Figure 5B:
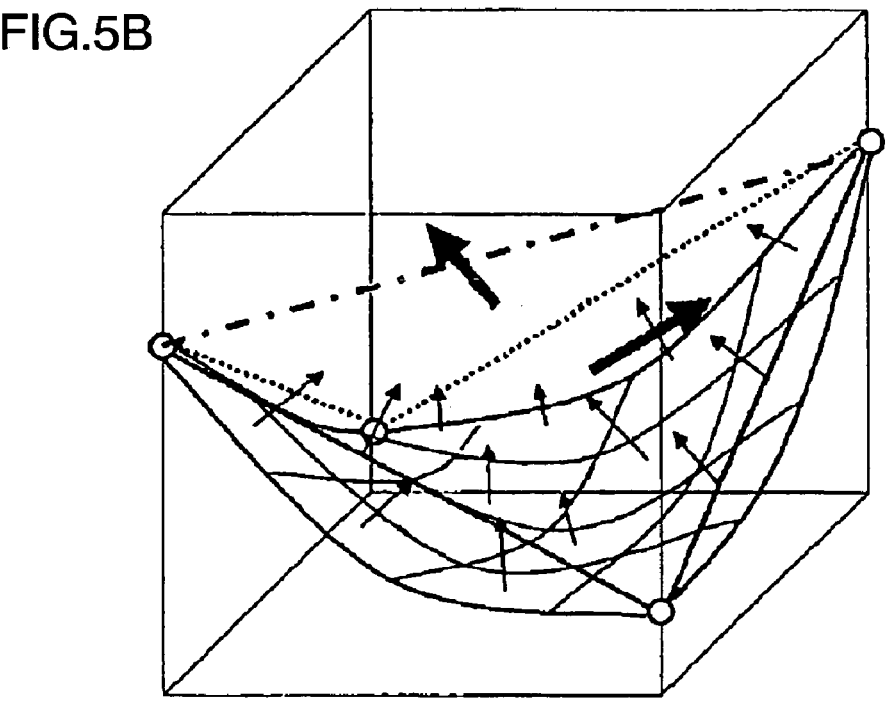

FIGS. 5A and 5B are schematic illustrations respectively showing methods of selecting the triangle division selecting manner. FIG. 5A shows an example of the most optimum method, and FIG. 5B shows an example of an inadequate method. According to the embodiment of the present invention, each of normal lines in normal line distribution on the input surface is extended to select one or more triangles on which the intersecting point with the extended normal line exists. Then, the triangle closest to the boundary surface part of the extended normal line is selected from the selected triangles in the cell to obtain an angle of the normal line of the selected triangle made with the extended normal line intersecting the triangle. These processes are performed for each of the normal lines in the in normal line distribution on the input surface. Then, the triangle dividing manner in which the maximum angle deviation (difference) between the normal line of the triangle and the extended normal line intersecting the triangle becomes smallest is selected from the plural triangles.

In the case where the input surface is a parametric surface, the normal line on the input surface is the normal line on each part formed by dividing a UV space by a specified number of divisions, and in the case where the input surface is data of triangle meshes, the normal line on the input surface is each normal line of the triangle meshes.

Figure 6A:
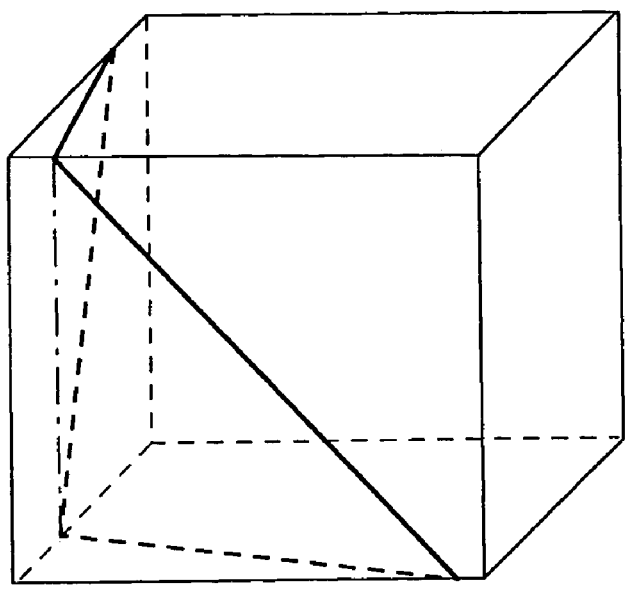
FIGS. 6A and 6B show examples of evolved KTC4a and KTC4b for a curved surface having a large curvature according to the embodiment of the present invention.
Figure 6B:
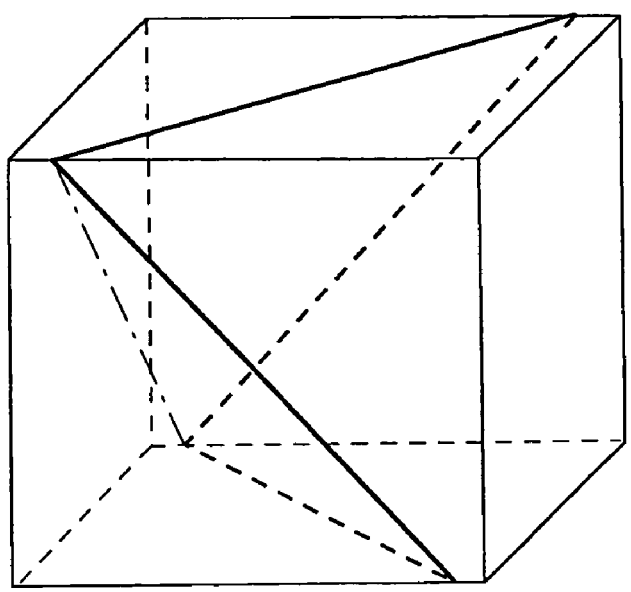

FIGS. 6A and 6B show examples in the evolved KTC4a and KTC4b that can be applied to a curved surface having a large curvature.

Different from the above-described examples, when the number of cut points is no fewer than 3 and no more than 6, the boundary surface determination step (D) may be performed by the patter matching as follows.

Figure 7A:
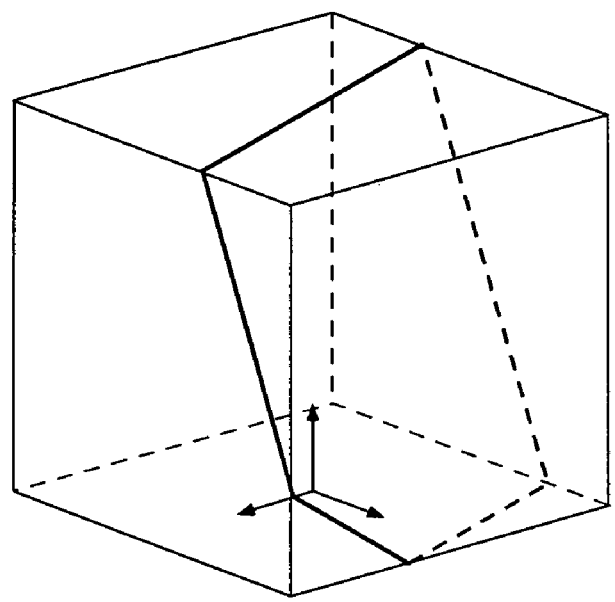
FIGS. 7A and 7B show other examples of KTC5 and KTC6 according to the embodiment of the present invention.
Figure 7B:
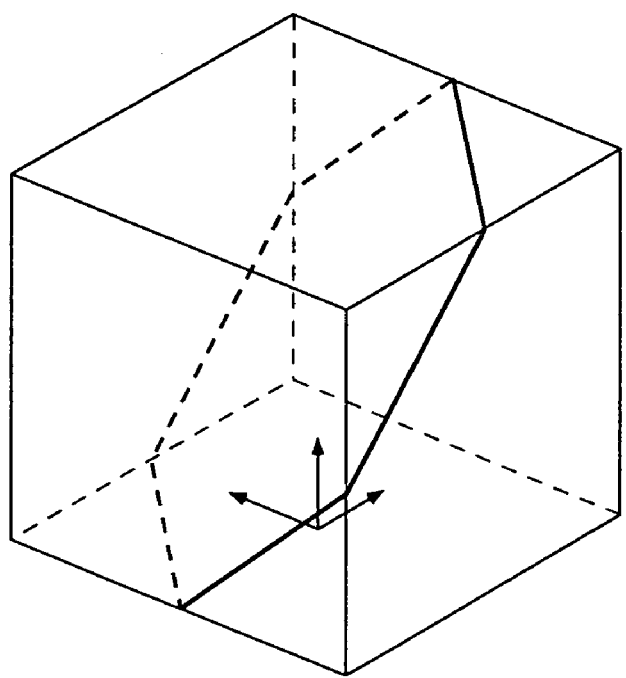

In this embodiment of the present invention, The boundary cells having 3, 4, and 5 cut points are classified into different boundary cell types KTC3, KTC4a, KTC4b, KTC5 and KTC6, respectively. FIGS. 7A and 7B show other examples of KTC5 and KTC6, respectively for reference.

Each KTC has the following characteristics.

In the case of KTC3, the three edges contacting each other via a pivot vertex are always represented by the two face marks selected from the same three face marks. In other words, when the three face marks representing one pivot vertex are cut into two face marks, the respective edges represented by the cut two face marks always contacting (crossing) each other via the pivot vertex. For example, the edges contacting each other via the pivot vertex LUF are LF, LU, and UF selected from LUF.

In the case of KTC4a, each of 4 edges contacting each other via one edge (called pivot edge) is represented by the two face marks that are determined by selecting one face mark from the two face marks of the pivot edge and adding to the selected face mark one face mark of the face marks that are not included in the face marks of the pivot edge and are not included in the face marks of the edges opposite to the pivot edge. For example, LU representing a pivot edge is decomposed into L and U. Then, B and F each of which is not included in L and U representing the pivot edge and is not included in R and D representing the edge opposite to the pivot edge LU are each added to decomposed L and U to form LF, UF, LB and UB that represent 4 edges contacting each other via the pivot edge LU. In the same manner, 4 edges contacting each other via a pivot edge DF are represented by LD, RD, LF, RF, respectively.

In the case of KTC4b, 4 edges perpendicular to one face (pivot face) are represented by two face marks selected from the face marks that excludes the mark of the pivot face and the mark of the face opposite to the pivot face. For example, 4 edges orthogonal to a pivot face L are represented by DB, DF, UB and UF that are the combination between one of D and U opposite to D and one of B and F opposite to B while excluding L and R opposite to L of the pivot face.

In the case of KTC5, when selecting a pivot surface and a pivot vertex on the pivot surface (KTC4b+KTC3), 4 edges are created in the same manner as the KTC4b, and the operation of "4 created edges XOR 3 edges contacting each other via the pivot vertex" is performed (union set minus product set). For example, when a pivot face is B, and a pivot vertex is RDB, the operation of (LD, LU, RD, RU) (for the pivot face B) XOR (RD, DB, RB) (for the pivot vertex RDB) results in (LD, LU, RU, DB, RB).

In the case of KTC6, a pivot vertex and a vertex opposite to the pivot vertex are selected so that the complement of KTC3 for the pivot vertex and KTC3 for the opposite vertex can be determined as 6 edges of KTC6 (complement of KTC3 and opposite KTC3 (12-3-3). For example, when selecting RDF as a pivot vertex, LUB is also selected as the opposite vertex so that the complement of 3 edges of KTC3 for RDF and 3 edges of opposite KTC3 for LUB can be determined as 6 edges of KTC6. In other words, in the case of KTC6, cut points on the complement edges of pivot vertex and the opposite vertex are connected. Loop formation is performed such that an arbitrary edge is selected (for example, RU), and next, the cut point of the edge contacting the selected edge (i.e., edge having the same mark R or U as RU) (in this example, RB or UF) is traced.

Algorism of extracting a surface in a cell requires the reverse procedure of the above-described procedure. In the following, a boundary cell type extraction algorism in the boundary surface determination step (D) will be described.

When cut points substantially correspond to a vertex, these cut points are considered as vertex shrinkage, and the vertex shrinkage is represented by KTC having 3 edges. In a preliminary process, cut target edges having cut points are sorted in the face direction order of LD to UF.

Next, a reverse KTC rule (KTC pattern is determined from cut points) will be described.

In the case of KTC3, as shown in the following Table 1, edge combinations corresponding to respective pivot vertexes are (LD, LB, DB), (LD, LF, DF), (LU, LB, UB), (LU, LF, UF), (RD, RB, DB), (RD, RF, DF), (RU, RB, UB), and (RU, RF, UF) that correspond to vertexes ① to ⑧. In the case of the vertex shrinkage where cut points are positioned at a vertex, it is checked whether or not the cut points can be classified into one of the combinations, and when the cut points can be classified, the vertex shrinkage is registered. Then, regarding the neighboring cells, the cell of the vertex shrinkage is copied to maintain the consistency or continuity.

TABLE 1

KTC3

| ① LDB | ② LDF | ③ LUB | ④ LUF | ⑤ RDB | ⑥ RDF | ⑦ RUB | ⑧ RUF |
|---|---|---|---|---|---|---|---|
| LD, LB, DB | LD, LF, DF | LU, LB, UB | LU, LF, UF | RD, RB, DB | RD, RF, DF | RU, RB, UB | RU, RF, UF |

In the case of KTC4a, there are 12 combinations of 4 edges corresponding to each pivot edge. As shown in the following Table 2, edge combinations corresponding to respective pivot edges are (LB, LF, DB, DF), (LB, LF, UB, UF), (LD, LU, DB, UB), (LD, LU, DF, UF), (RB, RF, DB, DF), (RB, RF, UB, UF), (RD, RU, DB, UB), (RD, RU, DF, UF), (LD, LB, RD, RB), (LD, LF, RD, RF), (LU, LB, RU, RB), and (LU, LF, RU, RF). These edge combinations are previously set, and when 4 cut points (4 edges) are obtained, the pattern matching is performed to determine the boundary cell type and the edge combination. In the case of vertex shrinkage, three edges are checked in the same manner as KTC3.

TABLE 2

KTC4a

| [1]LD | [2]LU | [3]LB | [4]LF | [5]RD | [6]RU |
|---|---|---|---|---|---|
| LB, LF, DB, DF | LB, LF, UB, UF | LD, LU, DB, UB | LD, LU, DF, UF | RB, RF, DB, DF | RB, RF, UB, UF |

| [7]RB | [8]RF | [9]DB | [10]DF | [11]UB | [12]UF |
|---|---|---|---|---|---|
| RD, RU, DB, UB | RD, RU, DF, UF | LD, LB, RD, RB | LD, LF, RD, RF | LU, LB, RU, RB | LU, LF, RU, RF |

In the case of KTC4b, as shown in the following Table 3, the pattern matching is performed for 3 combinations of (DB, DF, UB, UF), (LB, LF, RB, RF), and (LD, LU, RD, RU).

TABLE 3

KTC4b

| (1) L | (3) D | (5) B |
|---|---|---|
| (2) R | (4) U | (6) F |
| DB, DF, UB, UF | LB, LF, RB, RF | LD, LU, RD, RU |

In the case of KTC5, as shown in the following Table 4, there are 24 (6×4) combinations that correspond to combinations between a pivot face and a pivot vertex existing on the pivot face. In the case of vertex shrinkage, three edges are checked in the same manner as KTC3.

TABLE 4

KTC5

(1) L

| ① LDB | ② LDF | ③ LUB | ④ LUF |
|---|---|---|---|
| DF, UB, UF, LD, LB | DB, UB, UF, LD, LF | DB, DF, UF, UD, LB | DB, DF, UB, LU, LF |

(2) R

| ⑤ RDB | ⑥ RDF | ⑦ RUB | ⑧ RUF |
|---|---|---|---|
| DF, UB, UF, RD, RB | DB, UB, UF, RD, RF | DB, DF, UF, RU, RB | DB, DF, UB, RU, RF |

(3) D

| ① LDB | ② LDF | ⑤ RDB | ⑥ RDF |
|---|---|---|---|
| LF, RB, RF, LD, DB | LB, RB, RF, LD, DF | LB, LF, RF, RD, DB | LB, LF, RB, RD, DF |

(4) U

| ③ LUB | ④ LUF | ⑦ RUB | ⑧ RUF |
|---|---|---|---|
| LF, RB, RF, LU, UB | LB, RB, RF, LU, UF | LB, LF, RF, RU, UB | LB, LF, RB, RU, UF |

(5) B

| ① LDB | ③ LUB | ⑤ RDB | ⑦ RUB |
|---|---|---|---|
| LU, RD, RU, LB, DB | LD, RD, RU, LB, UB | LD, LU, RU, RB, DB | LD, LU, RD, RB, UB |

(6) F

| ② LDF | ④ LUF | ⑥ RDF | ⑧ RUF |
|---|---|---|---|
| LU, RD, RU, LF, DF | LD, RD, RU, LF, UF | LD, LU, RU, RF, DF | LD, LU, RD, RF, UF |

In the case of KTC6, as shown in the following Table 5, the pattern matching is performed for 4 edge combinations of a pivot vertex and the opposite vertex.

TABLE 5

KTC6

| ① LDB | ③ LUB | ④ LUF | ② LDF |
|---|---|---|---|
| ⑧ RUF | ⑥ RDF | ⑤ RDB | ⑦ RUB |
| LU, UB, RB, RD, DF, LF | LD, LF, UF, RU, RB, DB | LD, LB, UB, RU, RF, DF | LU, LB, DB, RD, RF, UF |

When there is a boundary cell that cannot be classified into the above boundary types KTC3 through KTC6, this boundary cell is left without classifying, or in accordance with necessity, the steps (A) through (F) are repeatedly performed.

FIGS. 8A through 8E show examples of boundary cells having 3, 4, 5 and 6 cut points, respectively when a boundary surface of boundary data is a curved surface. According to the embodiment of the present invention, the boundary cells having 3, 4, 5 and 6 cut points, respectively are classified into evolved boundary surface types KTC3, KTC4a, KTC4b, KTC5, and KTC6, respectively.

FIGS. 9A through 9F show examples of boundary cells having 7, 8, 9, 10, 11 and 12 cut points, respectively when the boundary surface consists of plane faces or the boundary surface is a curved surface.

The above described method of forming a closed loop in the boundary surface determination step (D) can also be applied to the case where the number of cut points is 7, 8, 9, 10, 11 or 12.

As described above, according to the data converting method of the embodiment of the present invention, by the oct-tree division step (A) and the cell classification step (B), it becomes possible to store, with a small memory capacity, external data 12 having cell hierarchical configuration that is formed by dividing the external data 12 of a target object into rectangular parallelepiped cells 13 having boundary planes orthogonal to each other.

Furthermore, cells having 3, 4, 5, and 6 cut points are classified into different boundary cell types KTC3, KTC4a, KTC4b, KTC5 and KTC6, respectively. Combinations of edges (ridgelines) to be cut are previously set for each boundary surface type, and the boundary surface type and the edge combination are determined based on obtained cut points and cut edges by the pattern matching. Alternatively, when the number of cut points is no fewer than 3 and no more than 12, the cut points may be traced and connected to form a closed loop. Therefore, according to the embodiment of the present invention, it is possible to store the boundary surface with the boundary cell type and the edge combination. Further, the data can be stored with a small memory capacity, and neighboring cell continuity can be held.

Furthermore, the polygon formed by the cut points is divided into a plurality of triangles that are formed by connecting the cut points. Then, each of the normal lines included in the boundary data of the external data 12 is extended, and the triangle that has the intersection point with the extended normal line and has the least distance from boundary surface part of the extended normal line is selected. Next, the angle made between the normal line of the selected triangle and the extended normal line is obtained. These processes are performed for each extended normal line. Thereafter, one triangle division manner in which the maximum angle deviation (difference) between the normal line of the triangle and the extended normal line becomes smallest is selected from a plurality of triangle dividing manners. In this manner, even when a boundary surface is a curved surface, it is possible to maintain the neighboring cell continuity and form the divided triangle meshes that can approximate the curved surface without generating a gap and a sharp angle between the triangles.

Thus, the data converting method and program of converting three-dimensional shape data into cell internal data have the following advantage. That is, for volume CAD, with the neighboring cell continuity being maintained, without generating a gap or forming an inaccurate triangle, it is possible to configure, from the external data, the cell internal data of which boundary surface can be divided into the triangle meshes that approximate even a curved surface having a large curvature with high accuracy.

The preferred embodiment of the present invention including several examples is described in the above. However, the present invention is not limited to this embodiment, and various improvements, modifications, and equivalents can be made without departing from scope of the present invention.

What is claimed is:

1. A method of converting three-dimensional shape data into cell internal data, comprising:
   inputting external data using an apparatus selected from the group consisting of a V-CAD interface, a measuring device, a sensor, a digitizer, a CT scan device and an MRI device;
   an oct-tree division step of dividing external data including boundary data of a target object into rectangular parallelepiped cells having boundary planes orthogonal to each other by oct-tree division;
   a cell classification step of classifying each of the cells into an internal cell positioned inside or outside the target object or a boundary cell including the boundary data;
   a cut point determination step of determining cut points of edges of the boundary cell based on the boundary data;
   a boundary surface determination step of connecting cut points to form a polygon and determining the polygon as the cell internal data when the number of the determined cut points is no fewer than 3 and no more than 12, wherein boundary cells having 3, 4, 5 and 6 cut points, respectively, are classified into different boundary cell types, wherein combinations of edges to be cut are previously set for each of the boundary cell types, and wherein the boundary cell type for each boundary cell is determined based on the determined cut points and cut edges by pattern matching;
   a triangle division step of dividing the polygon into a plurality of triangles by connecting the cut points, in one or more dividing manners;
   a triangle division selecting step of extending each of normal lines included in the external data, selecting from the plurality of triangles, the triangle that has an intersecting point with each extended normal line and has the least distance from boundary surface part of each extended normal line, obtaining an angle made between a normal line of the selected triangle and each extended normal line, and selecting the dividing manner in which a maximum angle difference between the normal line of the triangle and the extended normal line is smallest; and
   using the cell internal data to perform a simulation selected from the group consisting of designing, analyzing, processing, assembling and testing.

2. The method according to claim 1, wherein in the boundary surface determination step, tracing is performed only on the faces of the boundary cell through the cut points to form a closed loop as the polygon.

3. A method of converting three-dimensional shape data into cell internal data, comprising the steps of:
   inputting external data using an apparatus selected from the group consisting of a V-CAD interface, a measuring device, a sensor, a digitizer, a CT scan device and an MRI device;
   dividing external data including boundary data of a target object into rectangular parallelepiped cells having boundary planes orthogonal to each other by oct-tree division;
   classifying each of the cells into an internal cell positioned inside or outside the target object or a boundary cell including the boundary data;
   determining cut points of edges of the boundary cell based on the boundary data; and
   determining a boundary surface by connecting cut points to form a polygon, and determining the polygon as the cell internal data when the number of the determined cut points is no fewer than 3 and no more than 12, wherein when the boundary surface is determined, boundary cells having 3, 4, 5 and 6 cut points, respectively, are classified into different boundary cell types and wherein combinations of edges to be cut are previously set for each of the boundary cell types, and the boundary cell type for each boundary cell is determined based on the determined cut points and cut edges by pattern matching;

dividing the polygon into a plurality of triangles by connecting the cut points, in one or more dividing manners;

extending each of normal lines included in the external data, and selecting from the plurality of triangles the triangle that has an intersecting point with each extended normal line and has the least distance from boundary surface part of each extended normal line, obtaining an angle made between a normal line of the selected triangle and each extended normal line, and selecting the dividing manner in which a maximum angle difference between the normal line of the triangle and the extended normal line is smallest; and using the cell internal data to perform a simulation selected from the group consisting of designing, analyzing, processing, assembling and testing.

4. The method according to claim 3, wherein when the boundary surface is determined, tracing is performed only on the faces of the boundary cell through the cut points to form a closed loop as the polygon.

* * * * *